United States Patent [19]

Schmidt

[11] Patent Number: 4,865,669

[45] Date of Patent: Sep. 12, 1989

[54] METHOD OF MAKING BUSINESS FORMS WITH REMOVABLE LABELS

[75] Inventor: Eric R. Schmidt, River Forest, Ill.

[73] Assignee: Wallace Computer Services, Inc., Hillside, Ill.

[21] Appl. No.: 178,497

[22] Filed: Apr. 7, 1988

[51] Int. Cl.[4] .......................... B32B 7/04; B31B 1/60; B41L 1/20

[52] U.S. Cl. ...................................... 156/91; 156/159; 156/271; 282/12 A; 428/58; 428/138

[58] Field of Search ................. 156/157, 159, 91, 271, 156/301, 304.3, 309.3, 304.5, 324, 344, 250, 270, 268, 247, 248, 289; 428/189, 138, 77, 58, 41; 282/12 A, 11 A

[56] References Cited

U.S. PATENT DOCUMENTS

| | | | |
|---|---|---|---|
| 3,111,449 | 11/1963 | Gold et al. | 428/192 |
| 3,895,990 | 7/1975 | Josteit | 156/304.3 |
| 4,388,134 | 6/1983 | Long et al. | 156/304.3 |
| 4,517,044 | 5/1985 | Arnold | 156/289 |
| 4,544,590 | 10/1985 | Egan | 156/41 |
| 4,627,994 | 12/1986 | Welsch | 428/41 |
| 4,696,843 | 9/1987 | Schmidt | 428/189 |

*Primary Examiner*—Michael W. Ball
*Assistant Examiner*—Louis Falasco
*Attorney, Agent, or Firm*—Tilton, Fallon, Lungmus & Chestnut

[57] ABSTRACT

The invention consists of a method which provides a business form with removable labels. The method produces a business form which maintains its integrity and does not jam or damage production or processing equipment. It includes providing a first web comprising a bottom release ply, a top label stock ply, and adhesive disposed between these two piles for releasably joining the two together. It also provides a second web and places it in side-by-side laterally spaced relation with the first web. The method further includes the step of adhering a splicing strip to the first and second webs to join them together.

5 Claims, 2 Drawing Sheets

FIG. 1
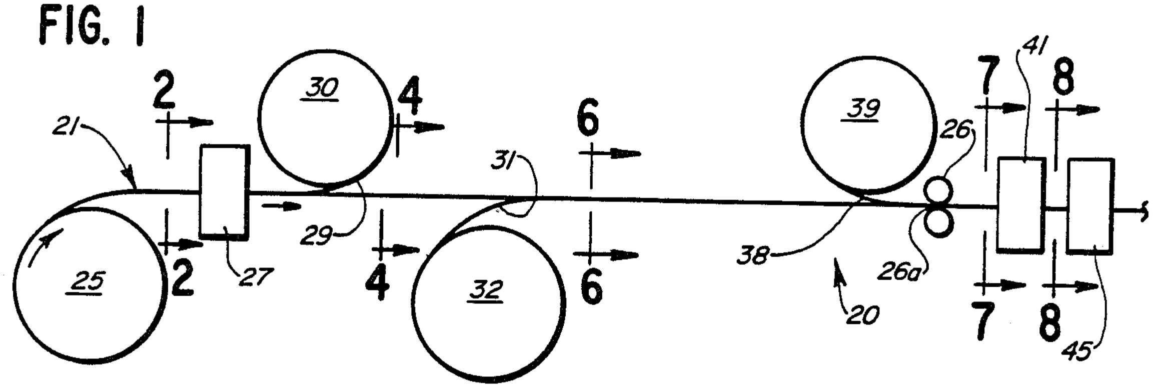
FIG. 3
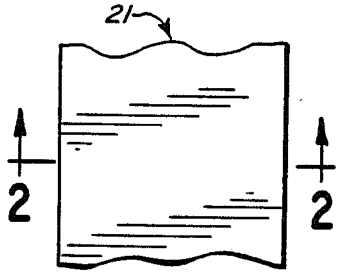
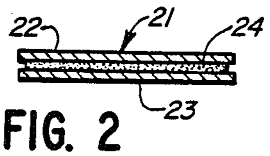
FIG. 2
FIG. 5
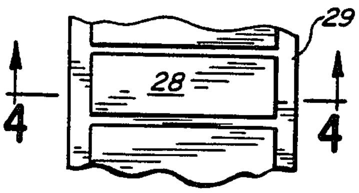
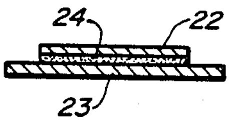
FIG. 4
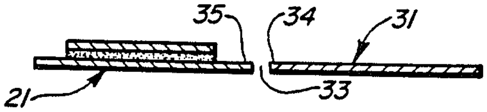
FIG. 6
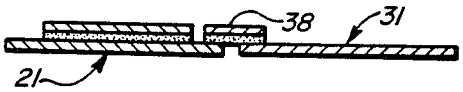
FIG. 7
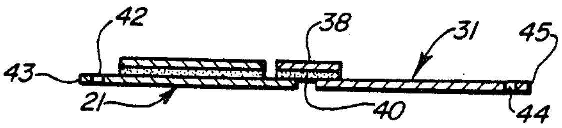
FIG. 8
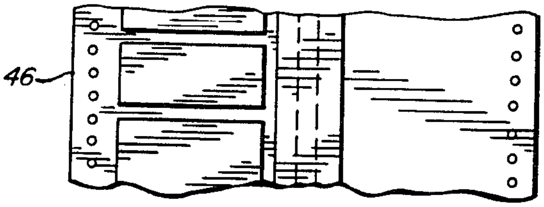
FIG. 9

METHOD OF MAKING BUSINESS FORMS WITH REMOVABLE LABELS

BACKGROUND OF THE INVENTION

1. Field Of The Invention

The present invention relates to a method of making a continuous business form, and, more specifically, to a method of making a continuous business form with removable labels with pressure sensitive adhesive.

2. Description Of The Prior Art

Many business applications require the use of continuous business forms which include removable labels and corresponding segments on which the user may place or record information relating to the corresponding label. The prior art includes a wide variety of these business forms and methods of making them. However, these prior forms and methods suffer a number of disadvantages.

For example, U.S. Pat. No. 4,627,994 discloses a label-providing business form. The method of making this business form includes providing an elongate release ply in side-by-side relation with an elongate record ply, joining the plies with an elongate ply of label stock, and cutting the label stock to define one or more labels and a matrix surrounding the labels. The matrix portion of the label stock maintains the connection between the release ply and the record ply. It does this through the use of the pressure sensitive adhesive which remains on the labels when the user removes them from the release ply.

The 4,627,994 product and the method which produces it suffer the following disadvantages. First, some applications require the use of label stock of low strength and pressure sensitive adhesive which releases easily. In these applications, the label stock matrix does not maintain the connection between the release ply and the record ply. Consequently, these two plies come apart and jam or damage the machinery which produces the business form and the machinery which uses it. Second, in applications which require oozing pressure sensitive adhesive, the adhesive may flow through the space between the release ply and the record ply and jam or damage production or processing machinery. Finally, in the 4,627,994 product and method of producing it, the manufacturer cannot control the width of the business form independently of the width of the label stock portion which maintains the connection between the release and record plies and the width of the removable label.

The method of the present invention avoids the shortcomings of the prior methods and produces a continuous business form of a simple and durable construction which does not jam or damage the machinery which make it and which use it.

SUMMARY OF THE INVENTION

Thus, it is an object of the present invention to provide an improved method of making a continuous business form with removable labels.

It is another object of the present invention to provide a method which permits the manufacturer to use a wide variety of label stock material and pressure sensitive adhesive while maintaining a reliable connection between the release ply and the record ply.

It is yet another object of this invention to provide a method which permits the manufacturer to vary the width of the business form without corresponding changes in width of the strip which connects the release ply and the record ply together and the width of the removable label.

Other objects, advantages and features of the present invention will become apparent upon reading the following detailed description and appended claims and upon reference to the accompanying drawings.

The method of the present invention achieves the foregoing objects; and, in a preferred embodiment, the method provides a first web. This first web includes a top label stock ply, a release ply disposed below the label stock ply, and adhesive disposed between the two plies and joining them together. The method includes the steps of cutting the label ply into label segments and a surrounding matrix, removing the matrix and forming control openings into the release layer along one of its side edges. Preferably, the surrounding matrix has a ladder-like configuration to allow continuous removal of the matrix from the first web.

In addition, the method of the present invention provides a second web and places it in side-by-side relation with the first web. This second web is a ply of paper stock suitable for receiving printed matter which relates to the labels. Alternatively, the second web may include a top label stock ply and a bottom release ply, joined together with adhesive disposed between them; and the method may further include the steps of cutting the label ply into segments and a surrounding matrix and removing the matrix.

Finally, the method includes adhering an elongate and continuous splice strip to connect the first and second webs together and perforating the resulting form transversely at predetermined intervals.

BRIEF DESCRIPTION OF THE DRAWINGS

For a more complete understanding of the present invention, one should now refer to the embodiments illustrated in greater detail in the accompanying drawings and described below by way of examples of the invention. In the drawings:

FIG. 1 is a schematic side elevation view of a production line which produces continuous business forms with releasable labels in accordance with the present invention;

FIG. 2 is a sectional view taken along line 2—2 in FIG. 1;

FIG. 3 is a fragmentary top plan view of the first web of FIG. 2 used in the method of the present invention;

FIG. 4 is a sectional view taken along line 4—4 in FIG. 1 and showing the first web;

FIG. 5 is a fragmentary top plan view of the first web of FIG. 4;

FIG. 6 is a sectional view of the first web taken along line 6—6 in FIG. 1;

FIG. 7 is a sectional view taken along line 7—7 in FIG. 1 and showing the first web and a second web;

FIG. 8 is a sectional view taken along line 8—8 in FIG. 1 and showing the first and second webs with control openings formed into them;

FIG. 9 is a fragmentary top plan view of a business form provided by the method of the present invention and shown in FIG. 8;

DETAILED DESCRIPTION

Figure 10:
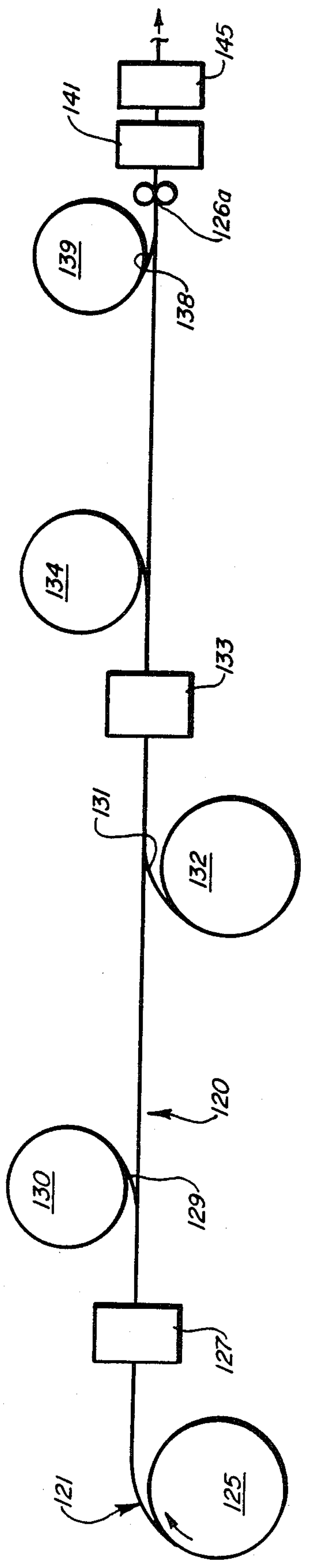
FIG. 10 is a schematic side elevation view of a modified production line which produces a modified continuous business form in accordance with the method of the present invention.

In the illustration given and with reference to FIG. 1, the numeral 20 designates generally a continuous business form production line. The form produced by the line 20 includes a composite web generally designated 21 (see FIG. 2) with a top label stock ply 22, a bottom release ply 23 and pressure sensitive adhesive 24 disposed between the top and bottom plies (a) for joining the two plies together and (b) for providing adhesive for the removable labels formed as described below. The label stock ply may be paper or other suitable material which can receive printed information. Similarly, the release ply 23 may be any suitable paper material coated with any one of a variety of known waxy substances, e.g., silicone. These substances facilitate the peeling away of the label ply and allow the adhesive 24 to have a greater affinity for the label stock ply. Alternatively, the release ply 23 may be any suitable synthetic (e.g. plastic) material. Finally, the adhesive 24 may be any suitable pressure sensitive adhesive.

The web 21 unwinds from a supply roll 25 and advances along a predetermined path down the production line 20 through suitable pull rolls as at 26. At station 27, a conventional die cutting mechanism or other similar mechanism cuts the top label stock ply 22 into individual labels 28 (see FIG. 5) and a surrounding matrix 29 which has a general ladder-like configuration. Further down the production line, the matrix 29 releases from the composite web 21 under the pulling force applied by driven waste roll 30. Since the adhesive 24 has a greater affinity for the label stock ply 22, the matrix 29 takes, along with it, the adhesive which lies between it and the release ply 23. (see FIG. 5)

The method of the present invention provides a second web generally designated 31; unwinds it from a supply roll 32; and advances it down the production line in side-by-side relation with the first web 21, leaving a gap 33 between an inside edge 34 of the second web 31 and the inside edge 35 of the web 21. (see FIG. 6) This gap 33 accommodates variances in the widths of the two webs 21 and 31 and prevents any overlap of the webs due to such variances. This second web 31, in the preferred embodiment, is a web of any suitable paper stock which may easily receive printed information on its surface. It serves as a record portion of the business form produced by the process of the present invention.

The two webs 21 and 31 advance further down the production line and, at the pressure nip 26*a* defined by the two pressure rolls 26, the two webs 21 and 31 receive and are joined by a splice strip 38. The splice strip 38 is any suitable material, e.g., paper; it unwinds from supply roll 39 and bridges the gap 33 between the inside edges 34 and 35 of the webs 31 and 21, respectively. An adhesive 40 of any suitable, conventional type firmly secures the splice 38 to the webs 21 and 31 to join these two webs together.

At station 41, a conventional hole punch mechanism forms one control opening 42 along an outer edge 43 of the release layer 23 and a second control opening 44 along an outer edge 45 of the web 31. (see FIG. 8) With these openings or margin line holes 42 and 44, business equipment which uses the business form provided by the process of the present invention advances the form through itself to process it.

FIG. 9 shows the business form 46 produced by the method of the present invention. This form has a constant maximum thickness because the present method prevents uncontrolled overlap of the webs. It will be noted that the splice strip 38 occupies the space vacated from the web 21 by the ladder-like matrix 29.

In addition, the form 46 maintains its integrity because the strip 38 secures the two webs 21 and 31 together without relying on the pressure sensitive adhesive 24. Conventional slitting apparatus forms a perforation transversely across this business form at station 45; and other suitable folding and stacking apparatus prepare the form for marketing.

Figure 11:
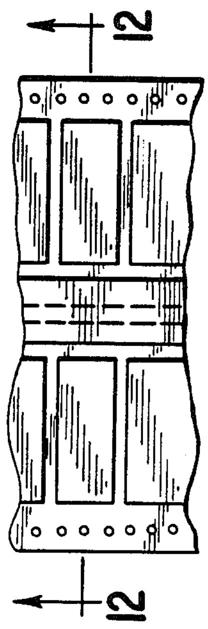
FIG. 11 is a fragmentary top view of the modified continuous business form produced by the production line shown in FIG. 10.

FIG. 11 shows an alternative embodiment which includes a first web 121 and a second web 131. Each of the webs in this alternative comprises a bottom release ply, a top label stock ply and adhesive disposed between the two and joining them together.

To produce this web, the production line 120 shown in FIG. 10 includes a supply roll 125 which provides the first web 121. A die cutting mechanism at station 127 cuts this web into labels and a surrounding matrix 129 which releases into waste roll 130 for disposal.

A supply roll 132 provides the second web 131 which advances down the production line in side-by-side relation to the web 121. At station 133 a die cutting device or other suitable mechanism cuts the second web into label portions and a surrounding matrix having a general ladder-like configuration. A waste roll 134 receives this matrix along with the adhesive disposed beneath it.

The two webs 121 and 131 advance further down the production line and at pressure nip 126*a* they receive a splice strip 138 from supply roll 139. This splice strip bridges the gap between the two webs and joins the two webs together. It does this with an adhesive 140 which firmly secures the strip 138 to the webs 121 and 131.

At station 141, the first web 121 receives control punches along its outer edge; and the second web 131 receives control punches along its outer edge.

Figure 12:
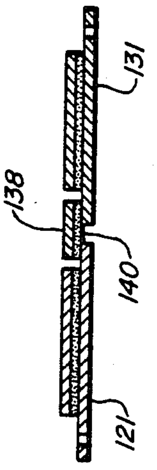
FIG. 12 is a sectional view taken along line 12—12 in FIG. 11.

The resulting business form (see FIGS. 11 and 12) receives transverse perforations at station 145. Other folding, sheeting or rewinding steps and packaging procedures may further prepare the business form for marketing.

Thus, the applicant has provided a method which allows the manufacturer to produce business forms with labels of any suitable material and provide the labels with any desired pressure sensitive adhesive. While the applicant has shown two preferred embodiments, one will understand, of course, that the invention is not limited to these embodiments as those skilled in the art to which the invention pertains may make modifications and other embodiments of the principles of the invention, particularly upon considering the foregoing teachings. The applicant, therefore, by the appended claims, intends to cover any modifications and other embodiments and incorporate those features which constitute the essential features of this invention.

What is claimed is:

1. A method of producing a continuous business form with removable labels, said method comprising: providing a first web including a bottom release ply, a top label stock ply cable of receiving printed information, and adhesive disposed between said bottom and top plies for releasably securing the top and bottom plies together; removing a continuous end portion of said top label stock ply to provide a vacated area on the bottom release ply; continuously advancing said first web and a second web, which is capable of receiving printed information, in side-by-side laterally spaced relation; and adhering a splicing strip to the vacated area of the bottom release ply of said first web and to an edge portion of said second web to connect said second and first webs together.

2. The method of claim 1 in which said second web also includes a top label stock ply and in which a continuous edge portion of said second web top label ply is removed prior to adhering said splicing strip to said first and second webs.

3. The method of claim 1 in which said top label ply is die cut to provide a series of longitudinally spaced labels adhered to said first web and a ladder-like matrix separable from said first web and in which said removing step includes removal of said matrix along with the underlying adhesive.

4. A method of producing a label-providing continuous business form comprising the steps of advancing a composite web along a predetermined path, said composite web including a bottom release ply, a top label stock ply capable of receiving printed information and an adhesive layer therebetween, removing a continuous portion from one edge of said top ply from said composite web, advancing a second web, which is capable of receiving printed information, in said path in spaced relation to said composite ply one edge and in co-planar relation to said composite web, adhering a continuous splicing strip to said composite and second webs in the edge portions adjacent each other to provide a label supplying business form wherein the composite web and united portions of the two webs having substantially the same height.

5. The method of claim 4 in which said second web is also a composite web including a top label stock ply and adhesive uniting said top label ply to said second web, said second composite web also having a continuous edge portion removed and said splicing strip uniting said two webs in the portions having edge portions removed therefrom.

* * * * *

UNITED STATES PATENT AND TRADEMARK OFFICE
CERTIFICATE OF CORRECTION

PATENT NO. : 4,865,669

DATED : September 12, 1989

INVENTOR(S) : Eric R. Schmidt

It is certified that error appears in the above-identified patent and that said Letters Patent is hereby corrected as shown below:

In column 4, line 65, delete "cable" and substitute therefor -- capable --.

Signed and Sealed this

Eighteenth Day of September, 1990

*Attest:*

HARRY F. MANBECK, JR.

*Attesting Officer*

*Commissioner of Patents and Trademarks*